Oct. 27, 1936.　　　　G. F. BAHR　　　　2,059,165
SPLASH GUARD FOR VEHICLE WHEELS
Filed Aug. 1, 1935
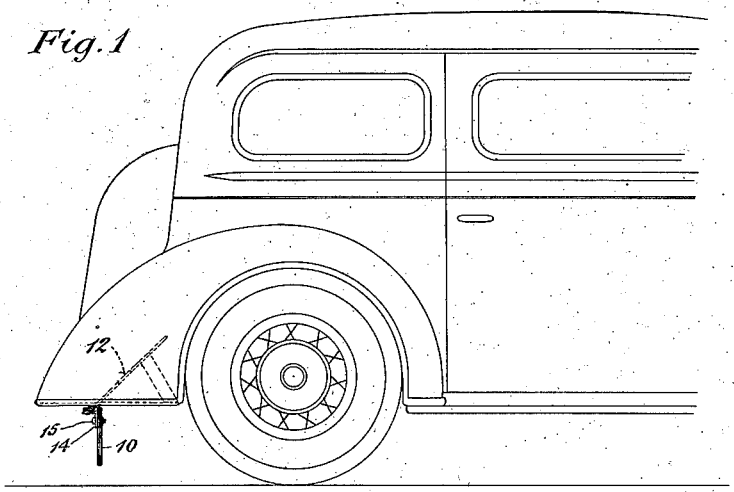
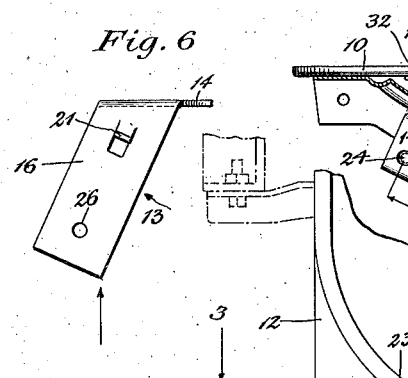
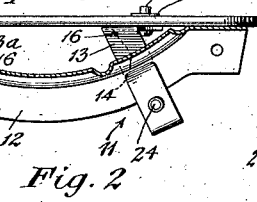
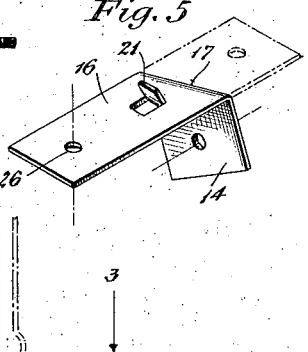
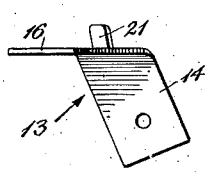
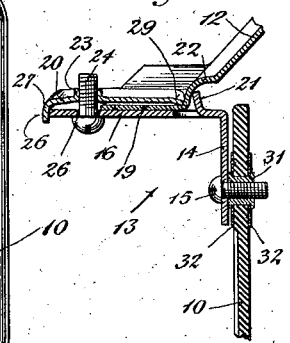
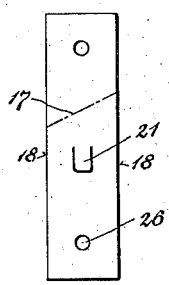
INVENTOR
G. F. Bahr
BY
ATTORNEY Patented Oct. 27, 1936

2,059,165

UNITED STATES PATENT OFFICE 2,059,165

SPLASH GUARD FOR VEHICLE-WHEELS

Gustave F. Bahr, Fairfield, Conn., assignor to Casco Products Corporation, Bridgeport, Conn., a corporation of Connecticut Application August 1, 1935, Serial No. 34,151

12 Claims. (Cl. 280—152)

This invention relates to splash guards for the fenders of motor vehicles, and more particularly, to convenient and substantial means for attaching splash aprons in operative position.

The present trend toward streamlining automobiles has affected not only the shape of the body and hood of cars, but also the shape and contour of the fenders, to the end that the rear lowermost part of the fenders are now far removed from the rearmost part of the tires on the wheels. This concession to less air resistance and style has altered the effectiveness of the fenders for preventing the splashing of mud and dirty water on parts of the body. To alleviate this condition somewhat various automobile manufacturers have attached a metal baffle plate inside of the rearward portion of the fenders, out of sight, and assuming substantially the position occupied by the rearward portion of the older style non-streamlined fenders.

It is proposed in this invention to attach to this metal baffle plate inside of the fender proper a flexible splash apron to further prevent the undesirable depositing of dirt and mud on other parts of the car. It is further intended that such attached splash apron shall not detract from the appearance of the car.

A particular object of the present invention is to provide a universal type of simple clamping means which can attach to various widths and thicknesses of flanged ends of metal baffle plates.

Another object of the present invention is to provide a splash apron and clamping means which will not become easily disassociated from the fender and baffle plate in the event that the clamping screws loosen to an extent.

It is a further object of the present invention to provide a clamping means with jaws which can be easily opened and yet can be held tightly clamped, all by the simple operation of turning a conveniently located screw.

A feature of this invention is the simple manner of preventing relative rotation between the two jaws of the clamping device during the assembly of the splash guard to an automobile fender-baffle, thereby facilitating installation.

Another feature is the provision of means for preventing the clamping screws from becoming loose due to jarring or vibration, by means of the constant tension exerted by the upper one of the clamping jaws in an inclined direction, and by means of the slight distortion of the threaded extrude of this jaw; these actions prevent inadvertent loss of the splash guard.

Other advantages and features will hereinafter appear.

In the drawing—

Figure 1 is a side view of the rear of an automobile, having attached to its fender baffle the present preferred form of splash guard, made in accordance with the present invention.

Figure 2 is an elevation of the splash guard, attached to the cut-away baffle plate, as seen from the rear of the car.

Fig. 3 is a top view of the splash guard, attached to the baffle plate, which is shown in section, on line 3—3 of Fig. 2.

Fig. 4 is a longitudinal sectional view of the attaching means provided by the present invention, applied to the baffle plate, shown also in section on line 4—4 of Fig. 3.

Fig. 5 is a perspective view of the right lower clamping member of the attaching means.

Fig. 6 is a top view of the right lower clamping member.

Fig. 7 is a front view of the right lower clamping member, as seen from the rear of the car.

Fig. 8 is a view of the blank metal stamping from which the right lower clamping member is bent.

The splash guard of the present invention comprises a flexible apron 10 which may be made of leather, fabric or the like, but which, for economy is preferably made of soft molded rubber, and is made of sufficient weight so that it hangs down and intercepts dirt, muddy water, and the like from being thrown onto other parts of the car during travel.

According to the present invention, there is provided a novel form of attaching means for securing the apron 10 to the baffle plate 12 of the car. This means comprises a right clamping and attaching means 11 and a left clamping and attaching means 11a, differing only in their lower clamping members 13 and 13a, which are both bent from similar blanks, but differ only in the direction of bending.

The lower metal clamping member 13 has a vertical arm 14 which is adapted to fasten to the flexible apron 10 by means of a screw 15. The other arm 16 of clamping member 13 is bent substantially at a right angle to arm 14, and the line of bending 17 cuts transversely the edges 18. Arm 16 of the clamping member 13 forms a jaw which is adapted to engage the flange 19 of the baffle plate 12 and also a complementary upper jaw 20. To further grasp the baffle plate, a tongue 21 is provided in arm 13, and engages with the under part of the rib 22 of the baffle plate 12 thereby preventing the clamp from sliding off the flange 19. The upper clamping jaw 20 is fitted with an extrude 23 which is threaded to engage the clamping screw 24.

The end of the clamping jaw 20 is bent downward so that it extends over the end of arm 16 of clamping member 13, and so that the under curved portion of the bend contacts with the edge of arm 16, thereby spacing jaw 20 from arm 16 and acting as a fulcrum about which the upper jaw is moved when the screw is tightened. This bend also prevents rotation of the clamp with respect to the arm during installation.

In this particular form of the invention, jaws 20 and 16 of the clamping members 11 are preferably made as physically separate parts, to facilitate opening and closing and provide for easy installation. Jaws 20 and 16 are rigidly clamped together and held against the baffle by passing the screw 24 through aperture 26 of jaw 16, and engaging it in the threaded extrude 23 of jaw 20. Jaw 20 is made slightly convex on top, with a more pronounced bend at the end 29, in order to better grasp the flange 19 of the baffle plate.

The clamping and attaching member 13 is fastened to the splash apron 10 by means of a screw 15, which preferably has a threaded connection with a sleeve 31 on the apron. The sleeve 31 is located in a suitable aperture in the apron and is headed-over on large washers 32 on opposite sides of the apron so it will remain rigidly secured thereto. In this manner the clamping members 13 and 13a are rotatably mounted with respect to the apron 10, so that they may be made to assume different arcuate positions relative to the screw, and longitudinal positions relative to the apron, thereby making it possible to adapt the clamping means 11 and 11a to the varying contours and curvatures of different makes of baffle plates. It is possible to secure the arm 14 of the clamping member 13 to the splash apron by having the screw 15 engage with a loose nut (not shown) and having loose washers on each side of the apron aperture; however, this plan is less substantial and less satisfactory than the method shown.

Thus it is seen that there is provided by this invention an easily attached extension to automobile fender baffle plates, hanging vertically therefrom, and intercepting dirt and other objectionable matter which might otherwise be thrown upon other parts of the car.

Other variations and modifications may be made within the scope of this invention, and portions of the improvements may be used without others.

Having thus described the invention, what is claimed as new and for which it is desired to obtain Letters-Patent is:—

1. An anti-splash assembly including the combination of an automobile fender; a baffle plate mounted in the fender ahead of the rear limit thereof, said plate having a flange extending from the lower end of the plate and which flange laterally thereof is substantially horizontal; an apron; and means engaging both the flange and the lower front portion of the baffle plate for suspending the apron near its top from said baffle plate.

2. An anti-splash assembly including the combination of an automobile fender; a baffle plate mounted in the fender ahead of the rear limit thereof, said plate having a flange extending from the lower end of the plate and which flange laterally thereof is substantially horizontal; an apron; and clamping means applicable to both the apron and said flange and lower front portion of the baffle plate for attaching said apron to said plate so that the apron hangs pendent therefrom and as an extension thereof.

3. An anti-splash assembly including the combination of an automobile fender; a baffle plate mounted in the fender ahead of the rear limit thereof, said plate having a flange extending from the lower end of the plate and which flange laterally thereof is substantially horizontal; an apron; and means engaging both the flange and the lower front portion of the baffle plate for clamping the apron to the flange so that said apron hangs flat and pendent from the baffle plate as an extension thereof.

4. In combination with a fender-carried baffle plate having a flange so shaped as to be longitudinally curved in plan view and also longitudinally curved in edge elevation, an anti-splash assembly including an apron; clamps for gripping the flange of the baffle plate; means for fastening said clamps to the apron to permit said apron to hang flat from the baffle plate when the clamps are attached to the curved flange of said plate.

5. In a clamp for suspending an apron from a fender-carried baffle plate having a flange extending from the lower end of the plate and which flange laterally thereof is substantially horizontal, an upper clamping jaw for engaging the upper surface of the flange; a lower clamping jaw for engaging the lower surface of the flange and having means for preventing removal of the clamp from the baffle plate when said jaws are loosely gripping the flange of said plate.

6. In a clamp for suspending an apron from a fender-carried baffle plate having a flange extending from the lower end of the plate and which flange laterally thereof is substantially horizontal, an upper clamping jaw for engaging the upper surface of the flange; a lower clamping jaw for engaging the lower surface of the flange; means on said jaws, including a flange of the upper jaw at its fulcrum end, for preventing turning of the jaws relatively to each other; and an arm of the lower jaw bent at an angle to said jaw for attaching same to the apron.

7. In a clamp for suspending an apron from a fender-carried baffle plate having a flange extending from the lower end of the plate and which flange laterally thereof is substantially horizontal, an upper clamping jaw for engaging the upper surface of the flange; a lower clamping jaw for engaging the lower surface of the flange and having means for preventing removal of the clamp from the baffle plate when said jaws are loosely gripping the flange of said plate; and an arm of the lower jaw bent at an angle to said jaw for attaching same to the apron.

8. In a clamp for suspending an apron from a fender-carried baffle plate having a flange extending from the lower end of the plate and which flange laterally thereof is substantially horizontal, an upper clamping jaw for engaging the upper surface of the flange; a lower clamping jaw for engaging the lower surface of the flange and the lower front portion of the baffle plate to prevent inadvertent loss of the clamp when the jaws are loosely gripping the plate.

9. In a clamp for suspending an apron from a fender-carried baffle plate having a flange extending from the lower end of the plate and which flange laterally thereof is substantially horizontal, an upper clamping jaw for engaging the upper surface of the flange; a lower clamping jaw for engaging the lower surface of the flange and having a tongue adapted to engage the lower front portion of the baffle plate to prevent longitudinal movement of the jaw in one direction.

10. In a clamp for suspending an apron from a fender-carried baffle plate having a flange extending from the lower end of the plate and which flange laterally thereof is substantially horizontal, a lower clamping jaw for engaging the lower surface of the flange, said jaw having a flat end about which it fulcrums; an upper clamping jaw for engaging the upper surface of the flange, and having a bend in its fulcrum and overlapping the flat end of the lower jaw to space said jaws and to prevent relative turning of the jaws.

11. In a clamp for suspending an apron from a fender-carried baffle plate having a flange extending from the lower end of the plate and which flange laterally thereof is substantially horizontal, a lower clamping jaw for engaging the lower surface of the flange; a draft screw for drawing the clamp together; and an upper metal clamping jaw for engaging the upper surface of the flange and having means receiving the threaded end of said draft screw and suffering distortion due to the draft of the screw for locking said screw against loosening.

12. In a clamp for suspending an apron from a fender-carried baffle plate having a flange extending from the lower end of the plate and which flange laterally thereof is substantially horizontal, an upper clamping jaw for engaging the upper surface of the flange; a lower clamping jaw for engaging the lower surface of the flange; and means carried by one of said jaws for preventing removal of the clamp from the baffle plate when said jaws are loosely gripping the flange of said plate.

GUSTAVE F. BAHR.